Figure 1:
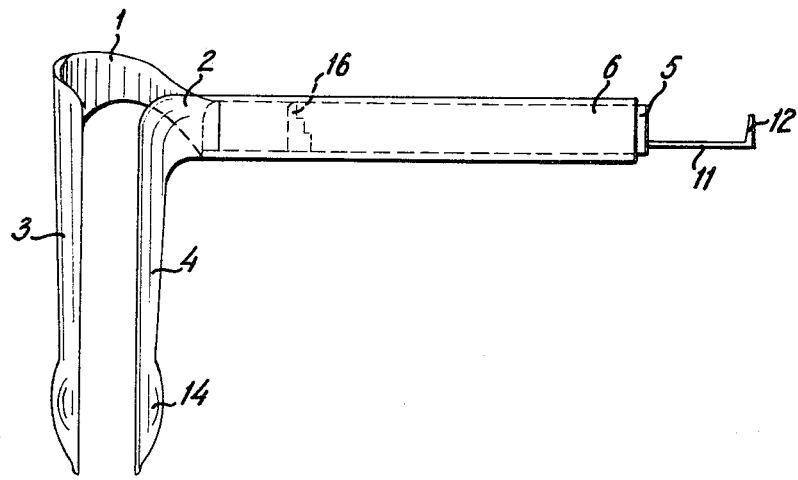

United States Patent [19]

Brammer

[11] 3,750,651

[45] Aug. 7, 1973

[54] SPECULUM

[75] Inventor: Max Brammer, Naestved, Denmark

[73] Assignee: Panther Plast A/S, Vordingborg, Denmark

[22] Filed: May 6, 1971

[21] Appl. No.: 140,823

[30] Foreign Application Priority Data
May 8, 1970 Denmark.............................. 2367/70

[52] U.S. Cl. ................................................ 128/20
[51] Int. Cl. ........................ A61b 1/30, A61b 17/02
[58] Field of Search ..................... 128/3, 17, 18, 20, 128/341, 345

[56] References Cited
UNITED STATES PATENTS

| 351,548 | 10/1886 | Watson | 128/17 |
|---|---|---|---|
| 3,246,646 | 4/1966 | Murphy, Jr. | 128/17 |
| 3,565,061 | 2/1971 | Reynolds | 128/20 |

Primary Examiner—Channing L. Pace
Attorney—Beveridge & De Grandi

[57] ABSTRACT

A speculum with an upper spatula and a lower spatula interacting therewith, which spatulas each comprise a spatula part intended for vaginal introduction and a handle part extending essentially perpendicularly thereupon. One handle part surrounds the other handle part in such a way that the two handle parts are displaceable only longitudinally in relation to each other for moving the spatula parts towards and away from each other and the surrounded handle part has at its end facing away from the spatula a longitudinally extending slot for accommodating an arresting body which is adapted, by being introduced into the slot, to effecting an expansion of the surrounded handle part in order to prevent any movements of said surrounded handle part in relation to the surrounding handle part.

4 Claims, 3 Drawing Figures

PATENTED AUG 7 1973  3,750,651

INVENTOR
MAX BRANNER

BY Beveridge & DeGrandi

ATTORNEYS

SPECULUM

The present invention relates to a speculum with an upper spatula and a lower spatula interacting therewith, which spatulas each comprise a spatula part intended for vaginal introduction and a handle part extending essentially perpendicularly thereupon, which handle parts are engagingly connected with each other in such a way that they are mutually displaceable in their longitudinal direction for moving the spatula parts towards and away from each other.

Specula of this type are used by doctors for gynaecological examinations.

From Danish Patent specification No. 97.961, a speculum of the type dealt with is known, in which on the one handle part a longitudinal guide rib is constructed which engages with a longitudinal groove in the other handle part, whereby the two handle parts can be longitudinally displaced in relation to each other in a safe manner without any undesirable lateral movements while setting the spatula parts, however, the prior art speculum suffers from the disadvantage that the doctor, when the spatula parts are introduced into the vagina and moved a suitable distance away from each other by a longitudinal displacement which is guided by the guide rib and the groove interacting with same, has to manually press the handle parts against each other in order to maintain the setting of the speculum. Hereby the doctor has only one hand free for the examination or treatment proper, a circumstance which can be particularly disadvantageous if additional instruments are to be employed for this purpose.

The speculum according to the invention is characteristic in that the one handle part surrounds the other handle part in such a way that the two handle parts are displaceable only longitudinally in relation to each other, in addition to which the surrounded handle part, at its end facing away from the spatula, has a longitudinally extending slot for receiving an arresting body which is adapted, by being introduced into the slot, to effecting an expansion of the surrounded handle part in order to wedge it in the surrounding handle part.

Thereby a speculum is provided which offers the same safe controllability as the prior art speculum dealt with in the foregoing without it being necessary for this purpose to construct a special rib on the one handle part and a special groove interacting with the rib in the other handle part, in addition to which the speculum according to the invention possesses the further advantage of particular significance for the user that by means of the arresting body it is possible to stop it in any desired position, the user, once the desired distance between the spatula parts has been set, merely has to insert the arresting body into the slot, for instance with a light tap against the protruding end of the arresting body. After this, the user has both hands free for the actual examination or treatment.

Figure 2:
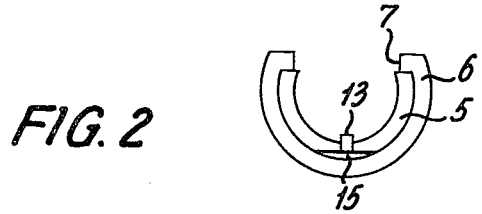
Figure 3:
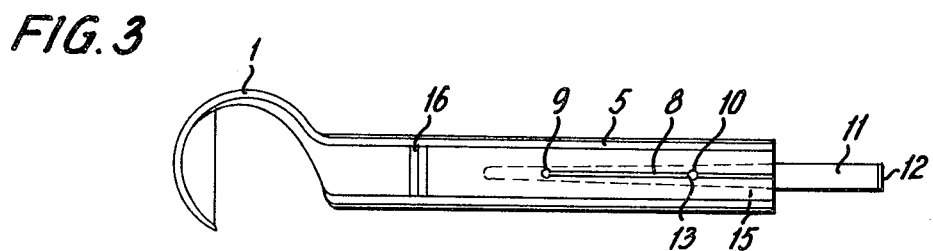

In the following, the invention is explained in greater detail on the basis of an embodiment with reference to the accompanying drawings, in which FIG. 1 shows an embodiment of a speculum according to the invention seen from the side, FIG. 2 shows the speculum illustrated in FIG. 1 seen from the end, and FIG. 3 shows the upper spatula of the speculum illustrated in FIGS. 1 and 2.

The speculum shown in FIG. 1 has an upper spatula 1 and a lower spatula 2, which spatulas each have a spatula part 3 and 4, respectively, and a handle part 5 and 6, respectively. The lower spatula 2 has, on its underside, an expansion 14, the function of which will be explained in greater detail in the following.

As appears from FIG. 2, the handle parts are essentially U-shaped and fitted inside each other so that the handle part 6 of the lower spatula 2 surrounds the handle part 5 of the upper spatula 1, in addition to which the edge parts of handle part 6 are bent over radially inwards or are provided with inwardly extending parts 7, with which the edge parts of handle part 5 are in loose contact, so that handle parts 5 and 6 are longitudinally displaceable in relation to each other but are unable to perform other movements in relation to each other. For carrying out the longitudinal displacement, a grip 16 can be provided on handle part 5.

As shown in FIG. 3, the upper spatula 1 is, at the free end of its handle part 5, constructed with a slot 8 extending in the longitudinal direction of the handle part and having two expanded parts 9 and 10, and handle part 5 has, in the area of the slot 8, a groove or track 15 in which an arresting body 11 with handle 12 can be accomodated. This arresting body has a projecting pin 13 which extends into the slot 8. This pin 13 is shown in FIG. 3 as being situated in the expanded part 10 of slot 8 which, just like the expanded part 9, denotes a position of rest of the arresting body, the expanded parts 9 and 10 having such a width that the pin, if it is disposed herein, does not bring about any expansion of handle part 5. However, if the arresting body 11, after the handle parts 5 and 6 and, thereby, the spatula parts 3 and 4, are set in a desired mutual position, is pushed inwards into the slot 8, for example, by a light tap against handle 12, the pin 13 is going to penetrate into slot 8 the width of which in the rest position is smaller than the diameter of the pin, whereby pin 13 brings about an expansion of handle part 5 so that its edge parts are pressed against the bent-over edge parts or the inwardly extending parts 7 on the handle part 6 of the lower spatula 2 in such a way that the handle parts and, thereby, the spatula parts, are secured in a safe manner relative to each other. The user of the speculum thereby has his hands free for the actual examination or treatment, in connection with which the speculum is used since the speculum will normally be able to keep itself in position once it has been introduced into the vagina and set. If the speculum is subjected to special influences during the treatment, for instance because the user has to work with other instruments, especially the expansion 14 which in FIG. 1 is shown on the lowe spatula 2 but which could just as well be constructed on the upper spatula 1 or in both places, is going to prevent undesirable movements of the speculum.

The speculum according to the invention is thus particularly convenient and expedient in use and, at the same time, it offers the practical advantage of it being possible to mail it assembled as a unit.

What I claim is:

1. A speculum with an upper spatula (1) and a lower spatula (2) interacting therewith, which spatulas each comprise a spatula part (3 and 4, respectively,) intended for vaginal introduction and a handle part (5 and 6, respectively,) extending essentially perpendicularly thereupon, which handle parts (5,6) are engagingly connected with each other in such a way that they are mutually displaceable in their longitudinal direction for moving the spatula parts (3,4) towards and away from each other, characterized in that the one handle part (6) surrounds the other handle part (5) in such a way that the two handle parts (5,6) are displaceable only longitudinally in relation to each other, in addition to which the surrounded handle part (5), at its end facing away from the spatula (3), has a longitudinally extending slot (8) for accommodating an arresting body (11) which is adapted, by being introduced into the slot (8), to effecting an expansion of the surrounded handle part (6).

2. A speculum as claimed in claim 1, characterized in that each of the handle parts (5,6) has an essentially U-shaped cross section and in that the edge parts on the surrounding handle part (6) have radially inwardly extending parts (7), so that the edge parts on the surrounded handle part (5) rest loosely against the inside of the inwardly extending parts (7) on the surrounding handle part (6), and in that the slot (8) serving to accommodate the arresting body (11) is constructed between these edge parts on the surrounded handle part (5).

3. A speculum as claimed in claim 1 or 2, characterized in that in the surrounded handle part (5), in the area of the slot (8), a groove (15) has been constructed for accommodating the arresting body (11) which is displaceable in the longitudinal direction of handle parts (5,6), which arresting body (11) has a projecting part (13) which extends into the slot (8).

4. A speculum as claimed in claim 3, characterized in that the slot (8) has at least one expanded part in which the width of the slot (8) is larger than or equal to the diameter of the part (13) projecting from the arresting body (11).

* * * * *